United States Patent [19]

Van Den Hombergh et al.

[11] Patent Number: 5,119,200
[45] Date of Patent: Jun. 2, 1992

[54] TELEVISION RECEIVER FOR SELECTIVELY BLOCKING VIDEO SIGNAL SAMPLES VIA STORED BLANKING SIGNALS

[75] Inventors: Petrus J. F. J. Van Den Hombergh; Herman J. R. Schmitz; Lauens Doornheim, all of Eindhoven, Netherlands

[73] Assignee: U.S. Philips Corporation, New York, N.Y.

[21] Appl. No.: 591,202

[22] Filed: Oct. 1, 1990

[30] Foreign Application Priority Data

Oct. 11, 1989 [NL] Netherlands ............ 8902516

[51] Int. Cl.$^5$ .......... H04N 5/445; H04N 7/04; H04N 7/087
[52] U.S. Cl. ............... 358/188; 358/142; 358/147; 358/165; 358/183
[58] Field of Search ........... 358/188, 191.1, 142, 358/145, 147, 160, 183, 181, 165

[56] References Cited

U.S. PATENT DOCUMENTS

| | | | |
|---|---|---|---|
| 4,233,628 | 11/1980 | Ciciora | 358/147 |
| 4,568,964 | 2/1986 | Doornheim | 358/147 |
| 4,595,952 | 6/1986 | Filliman | 358/142 |
| 4,628,479 | 12/1986 | Borg et al. | 264/900 |
| 4,633,297 | 12/1986 | Skerlos | 358/147 |
| 4,894,714 | 1/1990 | Christis | 358/147 |

FOREIGN PATENT DOCUMENTS 0393556 10/1990 European Pat. Off. .

OTHER PUBLICATIONS

Bown et al., "Comparative Terminal Realizations With Alpha-Geometric Coding", IEEE Transactions on Consumer Electronics, vol. CE-26, Aug. 1980, pp. 605-617.

*Primary Examiner*—James J. Groody
*Assistant Examiner*—Sherrie Hsia
*Attorney, Agent, or Firm*—William Squire

[57] ABSTRACT

In a television receiver which comprises a video memory for noise reduction, large-area flicker reduction, still pictures and the like, an additional picture is generated by also storing its pixels in the video memory. The pixels of the additional picture are generated once by a pixel generator protected from being overwritten by the video signal applied at a field frequency of 50 hz by also storing a blanking bit for each pixel, preventing the pixel from being overwritten by the video signal. The additional picture may be, for example, a teletext page or an operating menu.

15 Claims, 3 Drawing Sheets

TELEVISION RECEIVER FOR SELECTIVELY BLOCKING VIDEO SIGNAL SAMPLES VIA STORED BLANKING SIGNALS

BACKGROUND OF THE INVENTION

1. Field of the Invention

The invention relates to a receiver for television signals. Such a receiver may be, inter alia, a television receiver or monitor, a video recorder, or a compact disc video player. The invention particularly relates to a receiver for television signals, provided with a video memory of, for example, a field or picture memory for functions such as noise reduction, large-area flicker reduction or still picture, and further provided with an additional picture signal source for displaying, for example, teletext pages or On Screen Display information.

2. Description of the Art

A television receiver of the type described in the opening paragraph is known from U.S. Pat. No. 4,568,964. The additional picture signal source in this known receiver is a teletext decoder. This decoder generates a pixel signal which comprises the pixels of a teletext page to be displayed, as well as a predetermined value of a blanking signal for each pixel. The video memory includes a picture memory and comprises a matrix of memory elements in which samples of a picture signal to be displayed are stored in a predetermined manner. More particularly, a sample of the received video signal or a pixel of the teletext decoder is stored per memory element in the picture memory of the known receiver, dependent on the value of the blanking signal. To this end both the received video signal and the pixel signal of the teletext decoder are applied to a selector, in which selection is effected by means of the blanking signal. The signal thus selected is stored at the field frequency of the received video signal, for example, 50 Hz. In this known receiver the stored samples of the picture signal are subsequently read from the memory at the double field frequency, i.e. 100 Hz, and applied to a display screen. In the known receiver the usual large-area flicker is considerably reduced in this manner.

When the stored picture signal is displayed, the blanking signal blanks the video signal during the presence of a pixel of the teletext page. To this end the corresponding value of the blanking signal is also stored for each memory element in the picture memory, for example, by means of one extra bit per memory element.

In the known television receiver it is important that for each memory element both a video signal sample and a pixel of the teletext decoder are simultaneously applied to the selector, as well as the value of the blanking signal required for selection. In this respect it should be noted that the received video signal has a field frequency of 50 Hz, while the information for a teletext page to be displayed is obtained only once or sporadically. The teletext decoder in the known television receiver is therefore Provided with means, such as a teletext display memory and a fast character generator, for generating the pixel signal and the corresponding blanking signal also at a field frequency of 50 Hz. These means raise the costprice of such a television receiver.

SUMMARY OF THE INVENTION

One of the objects of the invention is to provide a receiver for television signals, provided with an additional picture signal source and a video memory, in which the means for generating the pixels of the additional picture signal source at a predetermined yield frequency are superfluous.

According to the invention the receiver is therefore characterized in that it is adapted to prevent at least a predetermined portion of a video signal sample from being stored in a memory element in response to a value of the blanking signal stored for the memory element. Thus the pixels to be displayed need to be generated and stored by the additional picture signal source only once and at a low speed. Thereafter, unwanted overwriting of the stored pixels by further applied video signal samples is obstructed. It is to be noted that it is known per se from U.S. Pat. No. 4,628,479 to protect individual locations of a memory from being overwritten. However, this is a memory in which character codes are stored in a non-repetitive way by only one source in the form of a microprocessor.

The prevention of storing video signal samples in the video memory is realized effectively in an embodiment of the receiver which is characterized in that for storage in a memory element of the video memory, it is adapted to select either the portion of the video signal sample or the additional pixel already stored in the memory element, the selection being effected in response to the value of the stored blanking signal.

Another embodiment of the receiver further includes means for generating a write signal for each video signal sample, and in that the video memory has a write input for receiving the write signal, which write signal is suppressed in response to the value of the stored blanking signal. Thus unwanted overwriting of a stored pixel is prevented.

A further embodiment of the receiver according to the invention includes a first memory which comprises the memory elements for storing video signal samples or additional pixels and in that a second memory is provided which comprises elements for storing the values of the blanking signal, an element of the second memory corresponding to a field of at least two memory elements of the first memory. This leads, inter alia, to an economy in the memory capacity required for storing the blanking signal.

A further embodiment of the receiver according to the invention includes means for generating ar erase signal and in that it is further adapted to refrain from preventing the storage of the portion of the video signal sample and to erase the stored blanking signal in response to the erase signal. While such an erase signal is being supplied during, for example, a field period of 20 msec, all applied video signal samples are stored in the video memory and the previously stored blanking signal is simultaneously erased. As a result the pixels of a stored teletext page are removed from the video memory in a fast and efficient way. Without these measures the additional picture signal source would have to address all the relevant memory elements in the video memory individually in order to erase the stored blanking signal. This is a time consuming activity in a television receiver having a video memory of, for example, 720×280 memory elements.

A television receiver according to the invention will be particularly appreciated if it is considered that, unlike a memory which is conventional for teletext display, the video memory which is already present in the receiver has a capacity of, for example, 720×280 memory elements, each of which is individually addressable and comprises 12 bits. This provides the particular advantage that the television receiver is not only suitable for displaying a teletext page but also for displaying, for example, an operating menu having a high resolution and 4096 color gradations. The additional picture signal source itself need not comprise a display memory for this purpose.

DESCRIPTION OF THE PREFERRED EMBODIMENTS

Figure 1:
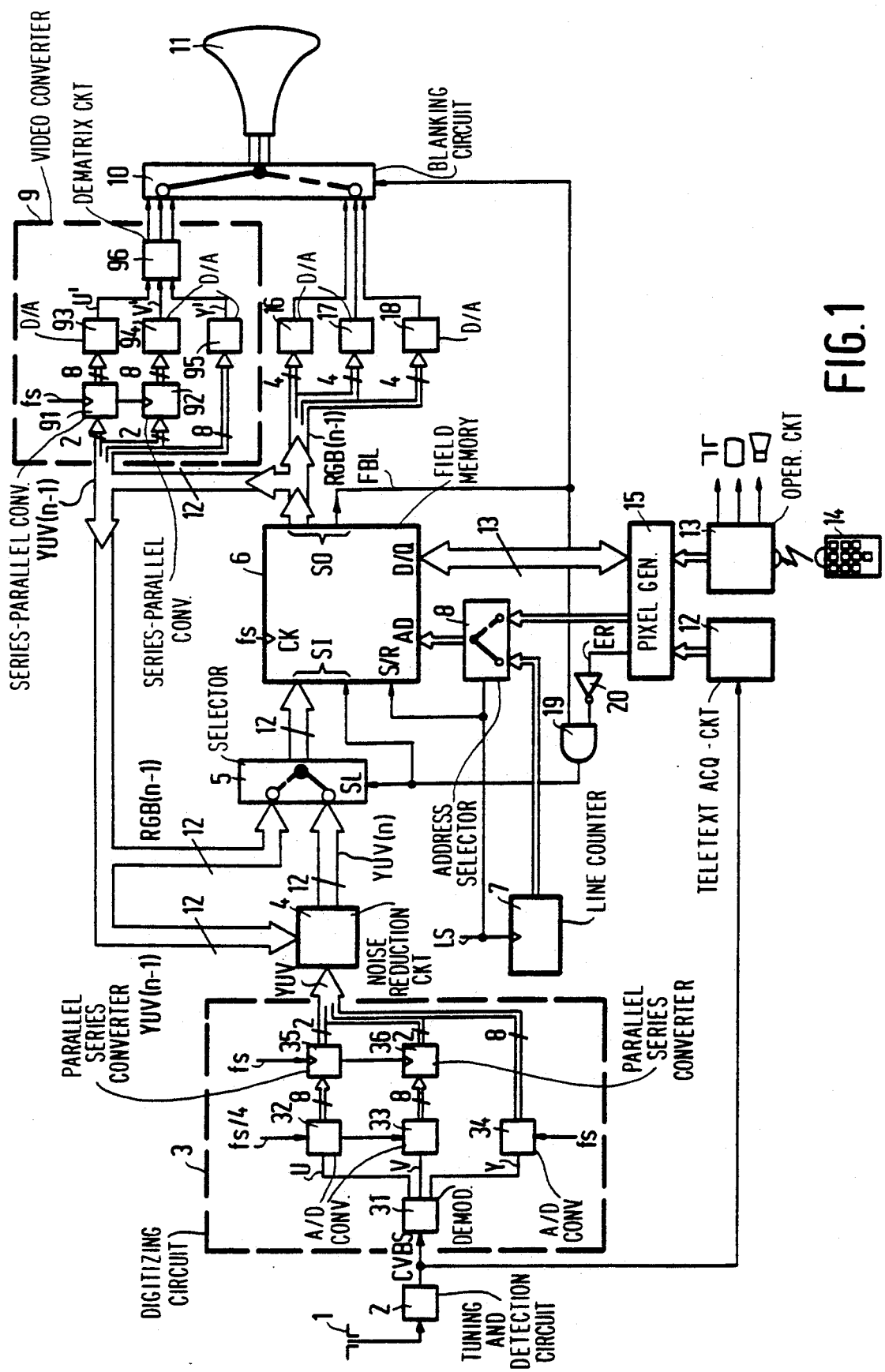
FIG. 1 shows the general structure of a first embodiment of a television receiver according to the invention.

In FIG. 1, transmitter signals received at an antenna 1 are applied to a conventional tuning and detection circuit 2. The composite video signal CVBS obtained therefrom is applied, inter alia, to a digitizing circuit 3. This circuit comprises a demodulator 31 for converting the composite video signal into a luminance signal y and two color difference signals U and V. The luminance signal y is subsequently sampled at a so-called sample frequency fs of, for example, 13.5 MHz, and quantised in eight bits in an A/D converter 34. Identically, but at a quarter of the sample frequency fs, 8-bit samples of the color difference signals U and V are obtained from A/D converters 32 and 33, respectively. The samples of these signals U and V are applied to parallel-series converters 35 and 36, respectively for converting the 8-bit samples at a frequency fs/4 into four successive 2-bit parts at a frequency fs. Thus, 12-bit samples YUV at a frequency of 13.5 MHz are available at the output of the digitizing circuit 3. The composite video signal CVBS is digitized in this way only during an active picture line period of approximately 53 psec. At the sample frequency of 13.5 MHz, 720 samples YUV are generated for each picture line. A video field comprises 280 of these picture lines with video information.

In this embodiment of the television receiver the obtained samples YUV are applied to a first input of a noise reduction circuit 4, a second input of which receives corresponding samples YUV(n−1) of the previous video picture which has already been displayed. The value of samples YUV(n) for the next video picture n to be displayed is computed in the noise reduction circuit 4 from the received samples YUV and the corresponding samples YUV(n−1) displayed in the previous video picture n−1. The relevant computation is irrelevant for a good understanding of the invention and will not be further described. The obtained samples YUV(n) are subsequently applied to a first input of a selector 5 and to a field memory 6 via this selector. In this respect it is tentatively assumed that selector 5 is in the position shown in solid line in response to a selection signal having a logic value "0" applied to an input SL. The dashed line shows a second position of selector 5.

Figure 2:
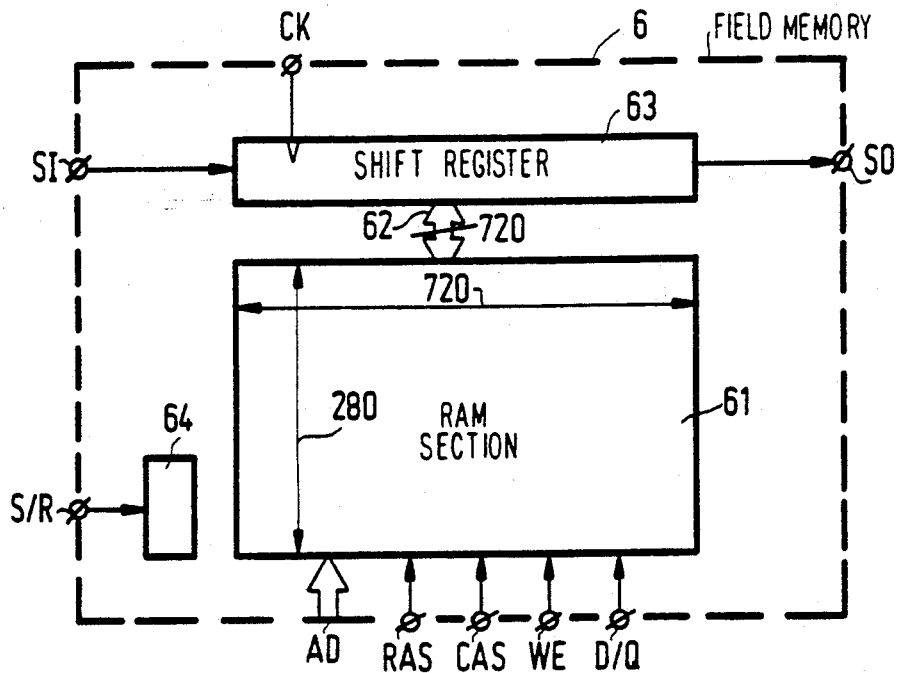
FIG. 2 shows an embodiment of a field memory shown in FIG. 1.

In the embodiment of the television receiver shown in FIG. 1 field memory 6 is a so-called "dual port video RAM". Such a memory is shown diagrammatically in FIG. 2 for 1-bit wide data. It comprises a random access memory section 61, generally known as DRAM, which comprises 280 rows and 720 columns. This DRAM has the conventional connections such as an address input AD, inputs RAS and CAS for identifying an applied address as a row or column address, a write input WE and a combined data input and output D/Q. Moreover, an addressed row is coupled by means of a bus 62 to a 720-bit shift register 63 which can be parallel loaded or read and which is further provided with a serial input SI, a serial output SO, and a clock input CK. The memory also comprises a control circuit E4 having a mode input S/R for selecting a serial or random access mode. In the random access mode the memory is used in known manner as a DRAM. In that case a row and a column address are successively applied to the address input AD in a so-called random memory cycle and, dependent on the write input WE, a bit is read or written via connection D/Q. In the serial access mode a row and a column address are applied to address input AD in a so-called serial memory cycle. If the write input WE is not active, the entire addressed row is transferred to shift register 63 in this mode. The 720 bits which are then available in the shift register are subsequently applied successively to the output SO by means of a clock signal applied to clock input CK, starting from the addressed column address. If the write input WE is active, the 720 bits applied to the shift register 63 via input SI are transferred in a corresponding way to the addressed row of the memory section 61.

In the field memory 6 of the television receiver shown in FIG. 1 thirteen of these memories are arranged in parallel for storing the 12-bit samples YUV(n) and a 13th bit which will further be referred to as blanking bit. The blanking bit has the value of the selection signal applied to the input SL of selector 5. It will be tentatively assumed that it has the logic value "0", but it will hereinafter be apparent when this is not the case. For storing the 720 samples YUV(n) of a picture line in the field memory, and for displaying the 720 samples YUV(n−1), a picture line counter 7 applies the corresponding picture line number via an address selector 8 (As shown in solid line, the dashed line showing an alternate position of the selector) to the address input AD of the field memory 6 upon the start of the relevant picture line during a serial memory cycle intended for this purpose. As a result the contents of the addressed memory row are transferred to the shift register 63 (see FIG. 2). Whenever a clock pulse occurs at the clock input CK, a sample YUV(n−1) becomes available at the serial data output SO of the field memory 6. Simultaneously, a new sample YUV(n) is stored in the shift register 63. At the end of the picture line the contents of the shift register 63, which now comprise 720 new samples YUV(n), are transferred to the addressed memory row and stored in this row in a serial memory cycle for the same picture line number. It is to be noted that for these operations address selector 8 is in the position shown in solid line during the two serial memory cycles only. During the rest of a picture line the address selector 8 is in the position not shown (dashed line) for addressing, to be further described, by another source. To this end, the address selector 8 is controlled, for example, by a line synchronizing signal LS. The line synchronizing signal LS is also applied to the mode input S/R of field memory 6 for selecting the access mode.

The 12-bit samples YUV(n−1) obtained at the serial memory output SO are applied to a video converter 9 for generating the three conventional red, green and blue (RGB) signals for display on a display screen 11.

To this end, video converter 9 comprises two series-parallel converters 91 and 92 for converting four successive 2-bit parts at a frequency fs into one full 8-bit U or V sample, respectively, at a frequency fs/4, two D/A converters 93 and 94 for obtaining analog color difference signals U' and V', and a D/A converter 95 for obtaining an analog luminance signal Y'. The series-parallel converters 91-92 and D/A converters 93-95 have the complementary function of the previously mentioned parallel-series converters 35-36 and A/D converters 32-34. Furthermore, video converter 9 comprises a dematrix circuit 96 for converting the luminance signal Y' and color difference signals U' and V' into the RGB signals which can be displayed. These RGB signals are applied via a blanking circuit 10 to the display screen 11 for displaying the video picture in which the noise is now reduced.

In this embodiment the received composite video signal CVBS from tuning and detection circuit 2 is also applied to a teletext acquisition circuit 12. This circuit is adapted in known manner to receive and store the picture information for a teletext picture to be displayed. This teletext picture information generally comprises a corresponding 8-bit code for each character to be displayed. The television receiver is also provided with an operating circuit 13. This circuit is adapted to receive operating instructions which are generated by the user by means of a (remote) control unit 14 and to control, in response to these operating instructions, station tuning, picture brightness, sound volume and the like. In FIG. 1 this is denoted by the appropriate symbols. Particularly, operating circuit 13 is adapted to generate the picture information for so-called On Screen Display pictures. Such pictures may not only be simple texts, like channel numbers, station names and the like, but also operating menus composed of graphic images. For example, in operating circuit 13 the picture information for an operating menu may comprise, for example, the following picture description:

draw a circle with a center (360, 140) and a radius 15 in color 4080;

fill the circle with color 240;

draw the letters "T" and "V" in color 4095 from position (348, 145). This picture description defines a round green button encircled by a yellow line and having a white inscription "TV" in the center of the display screen.

The teletext picture information and the operating picture information are applied for display to a pixel generator 15. This generator is preferably in the form of a microprocessor and is adapted to determine for each pixel to be displayed the display screen position of this pixel, as well as a color code in, for example, 4 bits of red, 4 bits of green and 4 bits of blue. Such a pixel generator is known from FIGS. 3 and 4 of "Comparative terminal realizations with alpha-geometric coding" published in IEEE Transactions on Consumer Electronics, Vol. CE-26, August 1980, pages 605-617. In the embodiment shown in FIG. 1 of the television receiver use can be made of, for example, a Graphics System Processor TMS 34010 of Texas Instruments. The pixels of a teletext or operating picture to be displayed are generated once and relatively slowly by the pixel generator 15, for example, not faster than 1 pixel per $\mu$sec. Moreover, the sequence of the pixels in terms of their position on the display screen is arbitrary.

The 12-bit color codes generated by pixel generator 15 and further referred to as RGB pixels, are applied via a bidirectional data bus to the random access data input and output D/Q of the field memory 6, Moreover, the pixel generator generates the previously mentioned blanking bit as the 13th bit. This blanking bit indicates by means of a logic value "1" that the corresponding 12-bit code is an RGB pixel to be distinguished from the previously mentioned 12-bit YUV samples. While an RGB pixel is being applied to the field memory 6, the pixel generator generates a memory address corresponding to the desired position on the display screen 11, and applies it via address selector 8 to the address input AD of the field memory 6. As already stated the address selector 8 is substantially always in the position (not shown-dashed line) intended for this purpose. During a random memory cycle the RGB pixel and the corresponding blanking bit are stored in the addressed memory location. It is to be noted that the previously mentioned process of serial writing and serial reading of the shift register 63 is not disturbed.

Thus, both YUV samples corresponding to the video picture to be displayed and RGB pixels corresponding to the teletext or operating picture also to be displayed are stored in the field memory, while for each memory element of the memory the type of the stored information is indicated by the blanking bit. Consequently, the signal from the serial memory output SO comprises successive memory elements which represent either samples YUV(n−1) or pixels RGB(n−1), as well as blanking bits FBL corresponding thereto.

The memory elements are not only applied to the video converter 9 but also to three D/A converters 16-18 each of which receives four bits of the memory element. If these D/A converters receive an RGB pixel, the conventional RGB signals are available at their outputs for displaying this pixel in a color envisaged by the pixel generator. Similarly as the RGB signals from video converter 9, these RGB signals are applied to display screen 11 via blanking circuit 10. Furthermore, the blanking bit FBL corresponding to each memory element is applied to blanking circuit 10, which bit blanks the video picture obtained from YUV samples if an RGB pixel is available, and blanks the teletext or operating picture if a YUV sample is available. As a result it does not matter that YUV samples are also applied to the D/A converters 16-18, and that RGB pixels are also applied to the video converter 9.

The successive blanking bits FBL obtained from the field memory are also applied to a first input of an AND gate 19. It will be tentatively assumed that a logic value "1" is constantly applied to the second input of this AND gate. During serial reading of memory elements from field memory 6, the corresponding blanking bits FBL are applied via the AND gate 19 to the input SL of selector 5 and to the 13th bit input of the serial memory input SI of field memory 6. Consequently, each blanking bit read from the field memory is stored again and in an unchanged form. A blanking bit with the logic value "1" once generated by pixel generator 15 is thus preserved. The other 12 bits applied to memory input SI originate from the selector 5. If the blanking bit has the logic value "0", this selector 5 selects a sample YUV(n) from noise reduction circuit 4 for the purpose of storage, as has been described hereinbefore. However, if the blanking bit has the logic value "1", selector 5 selects a pixel RGB(n−1) applied to a second input thereof from memory output SO in order to store this pixel again. This is the case when the memory element comprises an RGB pixel generated by the pixel generator. In this way the pixels of a teletext or operating picture stored once are protected from being overwritten by YUV samples.

A teletext or operating picture thus displayed simultaneously with a video picture can be erased, i.e. replaced by the video picture, in response to an erasing instruction. This erasing instruction is generally applied to the pixel generator 15 by the teletext acquisition circuit 12 (for example, upon reception of a new teletext page) or by the operating circuit 13 (for example, in response to an operating instruction obtained from the remote control unit 14). This generator addresses the pixels to be erased in the field memory 6 and stores the logic value "0" as 13th bit. If the corresponding memory element is subsequently again written via the serial input SI, selector 5 no longer selects the pixel RGB(n−1) which is already stored, but a sample YUV(n) from noise reduction circuit 4 since the blanking bit value has now been modified. However, it is not efficient to erase relatively large operating pictures or even display screen-filling teletext pages in this way, because the individual addressing of a large number of pixels by the relatively slow pixel generator 15 is time-consuming.

An efficient way of erasing a full teletext or operating picture is provided by means of an erase signal ER which is applied by the pixel generator 15 to the second input of the AND gate 19 via an inverter 20. For the normal operating condition hitherto considered, this erase signal ER has a constant logic value "0". However, in response to an erasing instruction the erase signal becomes active with the logic value "1" during at least one video field period of 20 msec. As a result, AND gate 19 applies the logic value "0" to the 13th bit input of the serial input SI of field memory 6, so that all blanking bits in the field memory 6 obtain the logic value "0" and are thus erased. Moreover, AND gate 19 applies the logic value "0" to the selection input SL of selector 5, which thus simultaneously applies a sample YUV(n) to field memory 6 for each memory element.

The erase signal ER can be generated in further known manner. For example, the pixel generator 15, which is implemented as a microprocessor, may be adapted by means of conventional program steps to generate a pulse of 20 msec at an output in response to the reception of the erasing instruction from television acquisition circuit 12 or operating circuit 13. It is to be noted that it is also possible to generate the erase signal ER during a selected portion of a video field period, for example, a portion corresponding to a rectangular box on the display screen.

Figure 3:
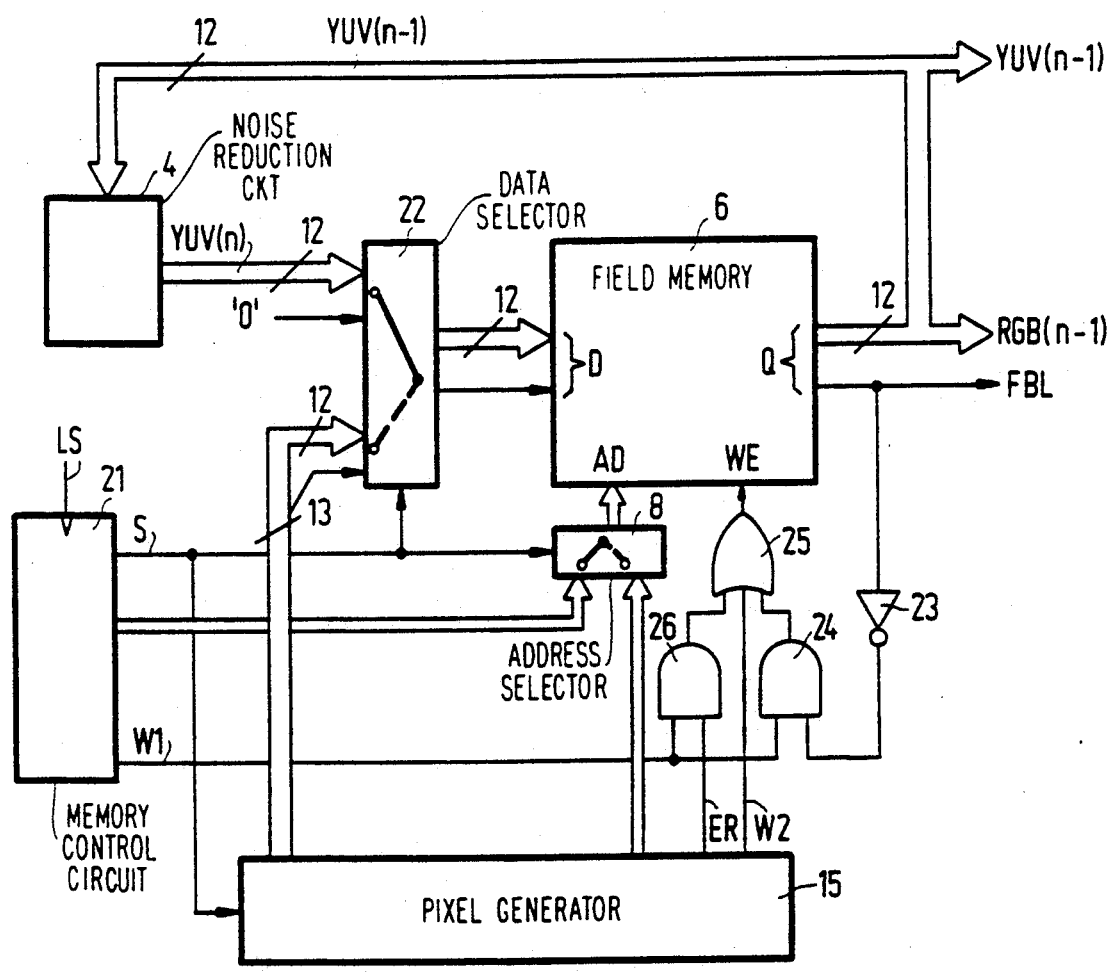
FIG. 3 shows the general structure of a second embodiment of the section of the television receiver of FIG. 1 relevant to the invention.

Another embodiment of the television receiver section which is relevant to the invention is shown in FIG. 3. The noise reduction circuit 4, field memory 6, address selector 8 and pixel generator 15 shown in this Figure correspond to the circuits in FIG. 1 having the same reference numerals. In FIG. 3 field memory 6 comprises conventional random access memories (RAMs). In this case the 13-bit wide data input D and output Q are shown separately. In practice they may be combined to one bidirectional data bus.

Now, 720 individual memory cycles are required for storing 720 successive samples YUV(n) from noise reduction circuit 4 in the field memory 6 during the active picture line period. This is in contrast to FIG. 1 in which only two memory cycles were necessary for this purpose. During each memory cycle a memory control circuit 21 applies a predetermined value of a selection signal S to a data selector 22 and to the address selector 8, which in response thereto are in the positions shown in solid line. The field memory is now addressed by memory control circuit 21 via address selector 8 and receives a sample YUV(n) from noise reduction circuit 4 via a first input of data selector 22, while a logic "0" is applied as the 13th bit. In FIG. 3 each one of the 720 memory cycles for storing YUV samples is a so-called "read-modify-write" cycle comprising two time intervals. In the first time interval the addressed memory element is read for display and for its supply to the noise reduction circuit 4. Moreover, the blanking bit FBL corresponding to the memory element obtained is applied to a first input of an AND gate 24 after inversion by an inverter 23. In the second time interval memory control circuit 21 generates a first write signal W1 with logic value "1" and applies it to a second input of this AND gate 24. If the blanking bit FBL now has the logic value "0" which as previously stated means that the memory element which has been read comprises a YUV sample, the output of AND gate 24 acquires a logic value "1" in response thereto. This output is connected to a first input of an OR gate 25 whose output signal is applied to a write input WE of the field memory 6. The addressed memory element thereby acquires a new value YUV(n) from the noise reduction circuit, while a logic "0" is stored as 13th bit. However, if the blanking bit FBL has the logic value "1", which means that the memory element comprises an RGB pixel, a logic "0" is applied to the first input of AND gate 24 via inverter 23. The write signal W1 applied to the second input of AND gate 24 is now suppressed for the addressed memory element so that there is no storage of a YUV sample and the RGB pixel, which has already been stored, is preserved.

If memory control circuit 21 does not apply the value of selection signal S for storing YUV samples to data selector 22 and address selector 8, these two selectors are in the other positions (dashed lines). In these positions, which are not shown in solid line, the field memory 6 is connected to the pixel generator 15 for storing RGB pixels and blanking bits corresponding thereto. Write input WE of the field memory 6 is activated in this case by a second write signal W2 which is generated by the pixel generator and applied by this generator to the memory via a second input of OR gate 25.

Furthermore, the television receiver shown in FIG. 3 is adapted to generate the erase signal ER. For erasing a teletext or operating picture, this erase signal with the logic value "1" is applied to a first input of an AND gate 26 which receives the write signal W1 at a second input. The output of this AND gate 26 is connected to a third input of an OR gate 25, so that the write input WE of the field memory is activated for each applied sample YUV(n) and the corresponding 13th bit with logic value "0", independent of the value of the blanking bit FBL received via AND gate 24.

In the television receiver shown in FIG. 3 the access to field memory 6 by pixel generator 15 is limited to the portion of a television field period in which no YUV samples are generated. To this end, the selection signal S corresponds, for example, to the horizontal and vertical flyback period of the video signal. In that case, only a small portion of the field period is available for storing RGB pixels. As a result, the rate at which a teletext or operating picture is generated by the pixel generator 15 is considerably slowed down. However, it is possible to alternate, within the active picture line period, one or more read-modify-write cycles for storing YUV samples with a memory cycle for storing RGB pixels. The selection signal S is applied to pixel generator 15 so as to inform it of the position taken up by data selector 22 and address selector 8.

Figure 4:
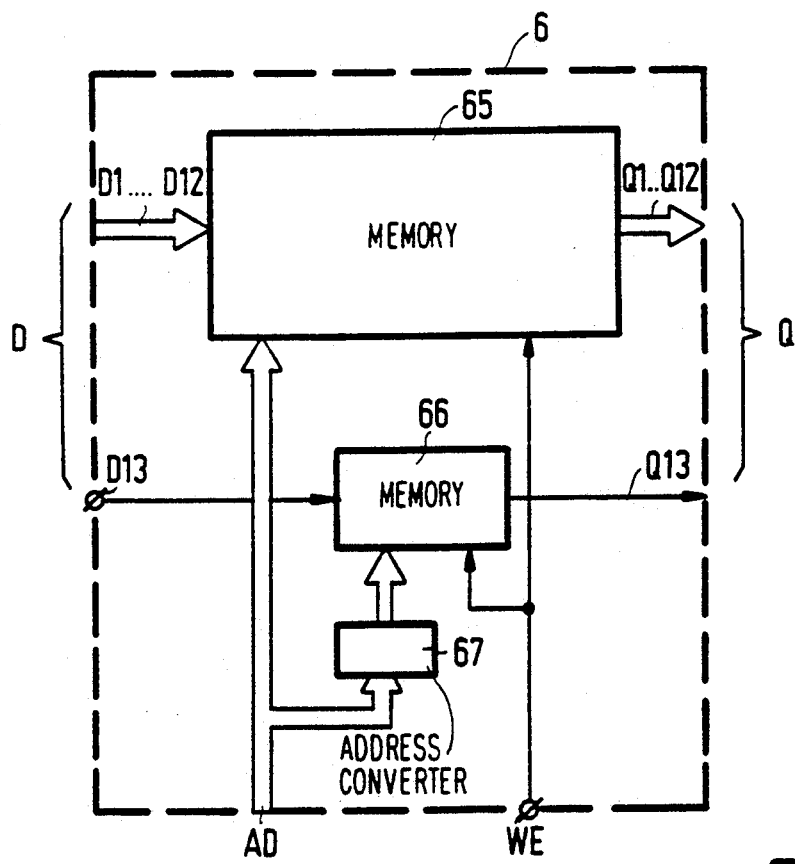
FIG. 4 shows an embodiment of a field memory shown in FIG. 3.

For the sake of completeness it is to be noted that it is useful in the shown embodiments of the television receiver according to the invention to compose teletext and operating pictures in fields of four successive RGB pixels. In fact, if this is not the case, and if, for example, one RGB pixel and three YUV samples are stored in four successive memory elements of the field memory 6, the video converter 9 generates one full 8-bit U sample and one full 8-bit V sample for these four memory elements in the manner described hereinbefore. The corresponding values of the color difference signals U' and V' from D/A converters 93 and 94 (see FIG. 1) are, however, dependent on the stored RGB pixel and they are no longer related to the video signal to be displayed originally. Thus, color errors in the video picture are produced at the edges of an individual RGB pixel. This is prevented by storing four RGB pixels. In this connection it is also useful to store not more than one blanking bit for four successive memory elements in the field memory 6. A possible embodiment of the field memory 6 shown in FIG. 3, with which is achieved, is shown in FIG. 4. In this FIG. 4 the field memory 6 is split up into a first 12-bit wide memory 65 for storing YUV samples or RGB pixels, a separate second memory 66 for storing blanking bits and an address converter 67. Memory 65 is split up into 280 rows and 720 columns in the manner described hereinbefore. Memory 66 is split up into 280 rows and only 180 columns. The address converter 67 is adapted to perform such a conversion of the applied address AO that four consecutive columns in memory 65 correspond to one column in memory 66, for example, by ignoring the two least significant bits of the applied address. This also leads to a considerable economy in the memory required for storing blanking bits.

The occurrence of the afore-mentioned color errors in the video picture can also be prevented by always storing the 2-bit U parts and 2-bit V parts of a sample YUV(n) (see FIG. 1) in all memory elements of the field memory 6, independent of the corresponding blanking bit. The other 8 bits of the memory element then either comprise the 8-bit y sample or the RGB pixel. The color difference signals U' and V' are now no longer disturbed. An RGB pixel now comprises 8 bits so that the number of color gradations in a teletext or operating picture is limited to 256.

Finally it is to be noted that the pixel generator 15 in the television receiver according to the invention may alternatively be adapted to generate a teletext or operating picture comprising YUV samples instead of RGB pixels. In that case the three D/A converters 16–18 and blanking circuit 10 are omitted in FIG. 1. A teletext or operating picture obtained in this way has considerably less definition due to the smaller bandwidth of the color difference signals. The television receiver may alternatively be adapted to store the video signal in the form of RGB values, which will then often comprise 24 bits. However, the blanking signal remains necessary for identifying memory elements corresponding to the video picture and memory elements corresponding to the teletext or operating picture.

What is claimed is:

1. A receiver for television signals, comprising:
   means for generating successive video signal samples at a predetermined field frequency;
   an additional picture signal source for generating individual additional pixels and a blanking signal;
   a video memory composed of addressable memory elements;
   means for storing a video signal sample or an additional pixel in each memory element, as well as a value of the blanking signal; and
   means including means adapted for each memory element to read the corresponding value of the stored blanking signal and means for preventing at least a predetermined portion of a video signal sample from being stored in a memory element in response to a predetermined value of said stored blanking signal.

2. A receiver storage as claimed in claim 1 wherein said means for storage in a memory element includes means for selecting either said portion of the video signal sample or the additional pixel already stored in the memory element, the selection being effected in response to said value of the stored blanking signal.

3. A receiver as claimed in claim 1 further including means for generating a write signal for each video signal sample, and in that the video memory has a write input for receiving said write signal, and means for suppressing the write signal in response to said value of the stored blanking signal.

4. A receiver as claimed in claim 1 wherein the video memory comprises the memory elements for storing video signal samples or additional pixels in a first memory and a second memory comprising elements for storing the values of the blanking signal, an element of the second memory corresponding to a field of at least two memory elements of the first memory.

5. A receiver as claimed in claim 1 further including means for generating an erase signal, means responsive to the erase signal adapted to refrain from preventing the storage of said portion of the video signal sample and means for erasing the stored blanking signal in response to the erase signal.

6. A receiver as claimed in claim 2 wherein the video memory comprises the memory elements for storing video signal samples or additional pixels in a first memory and a second memory comprising elements for storing the values of the blanking signal, an element of the second memory corresponding to a field of at least two memory elements of the first memory.

7. A receiver as claimed in claim 3 wherein the video memory comprises the memory elements for storing video signal samples or additional pixels in a first memory and a second memory comprising elements for storing the values of the blanking signal, an element of the second memory corresponding to a field of at least two memory elements of the first memory.

8. A receiver as claimed in claim 2 further including means for generating an erase signal, means responsive to the erase signal adapted to refrain from preventing the storage of said portion of the video signal sample and the stored blanking signal in response to the erase signal.

9. A receiver as claimed in claim 3 further including means for generating an erase signal, means responsive to the erase signal adapted to refrain from preventing the storage of said portion of the video signal sample and the stored blanking signal in response to the erase signal.

10. A receiver as claimed in claim 4 further including means for generating an erase signal, means responsive to the erase signal adapted to refrain from preventing the storage of said portion of the video signal sample and the stored blanking signal in response to the erase signal.

11. A receiver as claimed in claim 6 further including means for generating an erase signal, means responsive to the erase signal adapted to refrain from preventing the storage of said portion of the video signal sample and the stored blanking signal in response to the erase signal.

12. A receiver as claimed in claim 7 further including means for generating an erase signal, means responsive to the erase signal adapted to refrain from preventing the storage of said portion of the video signal sample and the stored blanking signal in response to the erase signal.

13. A receiver for television signals, comprising:
means for generating successive video signal samples at a predetermined field frequency;
an additional picture signal source for generating individual additional pixels and a blanking signal;
a video memory composed of addressable memory elements;
means for storing a video signal sample or an additional pixel in each memory element, as well as a value of the blanking signal;
means for preventing at least a predetermined portion of a video signal sample from being stored in a memory element in response to a value of the blanking signal stored for said memory element;
means for generating a write signal for each video signal sample, said video memory having a write input for receiving said write signal; and
means for suppressing the write signal in response to said value of the stored blanking signal.

14. A receiver for television signals, comprising:
means for generating successive video signal samples at a predetermined field frequency;
an additional picture signal source for generating individual additional pixels and a blanking signal;
a video memory composed of addressable memory elements;
means for storing a video signal sample or an additional pixel in each memory element, as well as a value of the blanking signal; and
means for preventing at least a predetermined portion of a video signal sample from being stored in a memory element in response to a value of the blanking signal stored for said memory element;
said video memory comprising memory elements for storing video signal samples or additional pixels in a first memory and a second memory comprising memory elements for storing the values of the blanking signal, an element of the second memory corresponding to a field of at least two memory elements of the first memory.

15. A receiver for television signals, comprising:
means for generating successive video signal samples at a predetermined field frequency;
an additional picture signal source for generating individual additional pixels and a blanking signal;
a video memory composed of addressable memory elements;
means for storing a video signal sample or an additional pixel in each memory element, as well as a value of the blanking signal;
means for preventing at least a predetermined portion of a video signal sample from being stored in a memory element in response to a value of the blanking signal stored for said memory element;
means for generating an erase signal;
means responsive to the erase signal adapted to refrain from preventing the storage of said portion of the video signal sample; and
means for erasing the stored blanking signal in response to the erase signal.

* * * * *